(12) United States Patent
Mahias et al.

(10) Patent No.: US 10,337,527 B2
(45) Date of Patent: Jul. 2, 2019

(54) TURBOMACHINE BLADE, COMPRISING INTERSECTING PARTITIONS FOR CIRCULATION OF AIR IN THE DIRECTION OF THE TRAILING EDGE

(71) Applicant: Snecma, Paris (FR)

(72) Inventors: Stéphane Mahias, Paris (FR); Olivier Chantoiseau, Livry sur Seine (FR); Laurent Gilles Dezouche, Coudray Montceau (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 546 days.

(21) Appl. No.: 14/948,648

(22) Filed: Nov. 23, 2015

(65) Prior Publication Data

US 2016/0153467 A1    Jun. 2, 2016

(30) Foreign Application Priority Data

Nov. 28, 2014    (FR) ..................... 14 61673

(51) Int. Cl.
| | |
|---|---|
| *F01D 5/18* | (2006.01) |
| *F04D 29/58* | (2006.01) |
| *B22F 3/105* | (2006.01) |
| *F04D 29/54* | (2006.01) |
| *F01D 9/02* | (2006.01) |
| *F01D 9/06* | (2006.01) |
| *B33Y 10/00* | (2015.01) |

(52) U.S. Cl.
CPC .......... *F04D 29/582* (2013.01); *B22F 3/1055* (2013.01); *F01D 5/18* (2013.01); *F01D 5/186* (2013.01); *F01D 5/188* (2013.01); *F01D 9/02* (2013.01); *F01D 9/06* (2013.01); *F04D 29/542* (2013.01); *F04D 29/584* (2013.01); *B33Y 10/00* (2014.12); *F05D 2230/13* (2013.01); *F05D 2240/122* (2013.01); *F05D 2250/28* (2013.01); *F05D 2250/283* (2013.01); *F05D 2260/221* (2013.01); *Y02T 50/676* (2013.01)

(58) Field of Classification Search
None
See application file for complete search history.

(56) References Cited

U.S. PATENT DOCUMENTS

| | | | |
|---|---|---|---|
| 3,819,295 A | 6/1974 | Hauser | |
| 5,370,499 A | 12/1994 | Lee | |
| 7,674,092 B2 * | 3/2010 | Annerfeldt | F01D 5/187 |
| | | | 416/97 R |
| 9,366,143 B2 * | 6/2016 | Lee | F01D 5/186 |

(Continued)

OTHER PUBLICATIONS

Search Report issued in French Patent Application No. FR 14 61673 dated Jul. 16, 2015.

*Primary Examiner* — Kayla McCaffrey
(74) *Attorney, Agent, or Firm* — Pearne & Gordon LLP

(57) ABSTRACT

The invention relates to a turbomachine blade comprising a vane. The vane comprises a leading edge, a trailing edge, a pressure face and a suction face spaced apart from each other and connecting the leading edge to the trailing edge. The vane further comprises at least one internal cavity between the pressure face and the suction face, wherein air is intended to flow. The vane comprises intersecting transverse partitions, downstream of the cavity, so that air can flow from the cavity in the direction of the trailing edge between the intersecting partitions.

14 Claims, 2 Drawing Sheets

(56) References Cited

U.S. PATENT DOCUMENTS

2012/0128482 A1    5/2012  Dezouche
2012/0201653 A1*   8/2012  Moga ..................... F01D 5/147
                                                    415/115

* cited by examiner

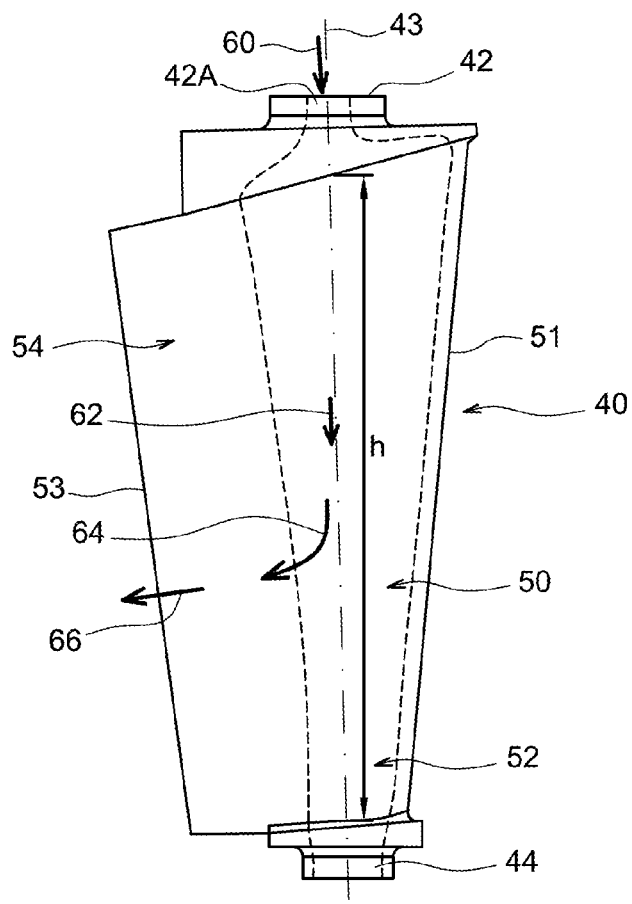
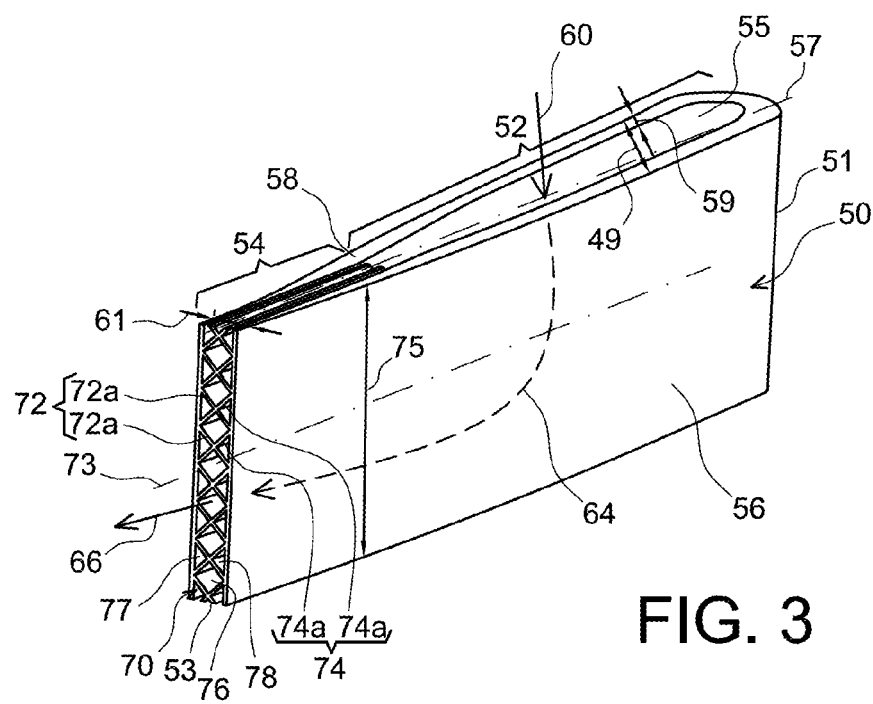

TURBOMACHINE BLADE, COMPRISING INTERSECTING PARTITIONS FOR CIRCULATION OF AIR IN THE DIRECTION OF THE TRAILING EDGE

TECHNICAL FIELD

The invention relates to turbomachine blades. More precisely, the invention relates to heat exchanges at the trailing edge of a turbomachine blade.

PRIOR ART

A turbomachine blade comprises a vane. The vane comprises a leading edge, a trailing edge, and a pressure face and a suction face spaced apart from each other and connecting the leading edge to the trailing edge. As is known, the vane further comprises an internal cavity.

The blades at the inlet to a compressor are in contact with particularly cold air. The cavity has the air coming from the compressor pass through it, so as to heat the vane in order to prevent frosting of the vane.

However, a compressor inlet stator blade, also a compressor inlet impeller blade, comprises a blade with a thickness that is particularly fine compared in particular with the thickness of a turbine blade vane. This small thickness is detrimental to the heat exchanges inside the vane, in particular those close to the trailing edge. The compressor inlet stator blades are moreover generally more extensive radially than the turbine blades.

There therefore exists a need to improve the heat exchanges inside a turbomachine blade, while limiting the increase in the thickness of the blade vane.

DISCLOSURE OF THE INVENTION

The invention aims to at least partially solve the problems encountered in the solutions of the prior art.

In this regard, the subject matter of the invention is a turbomachine blade. The blade comprises a vane. The vane comprises a leading edge, a trailing edge, and a pressure face and a suction face spaced apart from each other and connecting the leading edge to the trailing edge. The vane further comprises at least one internal cavity between the pressure face and the suction face, wherein air is intended to flow.

According to the invention, the vane comprises intersecting transverse partitions, in an internal intersection space arranged between the pressure face and a suction face downstream of the cavity, so that air can flow from the cavity in the direction of the trailing edge between the intersecting partitions.

The intersecting transverse partitions enable the air flowing in the vane to cool or heat the inside of the vane more effectively, while limiting the increase in the thickness of the vane.

In particular, the intersecting transverse partitions improve the heat exchanges between the air and the walls of the vane in the vicinity of the trailing edge.

The blade is preferably a compressor inlet blade, the thickness of which, measured between the pressure face and the suction face, is particularly small.

In this case, the transverse partitions make it possible more to limit the increase in the thickness of the vane while offering both suitable strength of the vane and effective heating of the vane by the air flowing between the intersecting partitions.

The air flowing in the vane comes in particular from a turbomachine compressor.

The invention may optionally comprise one or more of the following features combined together or not.

Advantageously, the intersecting transverse partitions extend as far as the trailing edge formed partly by the intersecting transverse partitions, so that air can flow between the intersecting transverse partitions across the trailing edge.

In this configuration, the trailing edge is formed partly by the intersecting transverse partitions, which all the better assist the heat exchanges at the trailing edge.

According to an advantageous embodiment, the intersecting transverse partitions are spaced apart from each other along the spanning direction of the vane. This spacing is for example regular in the spanning direction of the vane.

The air that has flowed in the vane preferably emerges at the trailing edge with a direction substantially parallel to that of the air flowing along the pressure face and the suction face, that is to say substantially perpendicular to the trailing edge.

According to another advantageous embodiment, the intersecting transverse partitions extend at least over the majority of the extent of the cavity in the spanning direction. This spanning direction is the radial direction of the vane.

The intersecting transverse partitions preferably extend over substantially the entire extent of the trailing edge in the spanning direction of the vane.

According to a particular embodiment, at least one of the intersecting transverse partitions extends from the pressure face as far as the suction face.

Preferably, the blade comprises an attachment portion, external or internal, delimiting an air inlet emerging in the cavity. The intersecting transverse partitions preferably determine rows of alveoli, the longitudinal axes of which are both substantially parallel to a longitudinal direction of the vane and transverse to the air inlet. The axes of the alveoli are in particular substantially orthogonal to the air inlet.

According to another design particularity, the intersecting transverse partitions form a regular mesh.

This regular mesh preferably comprises a middle row of alveoli with a cross-section in the form of a quadrilateral. Two lateral rows of alveoli with a triangular cross-section are in particular arranged on either side of this middle row.

In a variant, the alveoli may take other simple polygonal forms, for example a regular hexagonal cross-section. Moreover, it is possible for the alveoli to be disposed in only two rows or in more than three rows.

The intersecting transverse partitions are preferably inclined with respect to both the pressure face and the suction face.

Advantageously, all the transverse partitions are intersecting, so as to form crossbars.

The invention also relates to a turbomachine compressor comprising at least one blade as defined above, the blade being an inlet stator blade of the compressor.

The invention also relates to a turbomachine comprising a compressor as defined above. The turbomachine is preferably a turboprop engine.

Finally, the invention relates to a method for manufacturing a blade as defined above. The method comprises a step of manufacturing the intersecting transverse partitions by the laser fusion of metal powder.

BRIEF DESCRIPTION OF THE DRAWINGS

The present invention will be better understood from a reading of the description of example embodiments given purely for indication and in no way limitatively, referring to the accompanying drawings, in which:

FIG. 2 is a schematic representation, in side view, of an inlet stator blade of the compressor of the turbomachine depicted in FIG. 1;

FIG. 3 is a partial schematic view of the blade vane depicted in FIG. 2.

DETAILED DISCLOSURE OF PARTICULAR EMBODIMENTS

Figure 1:
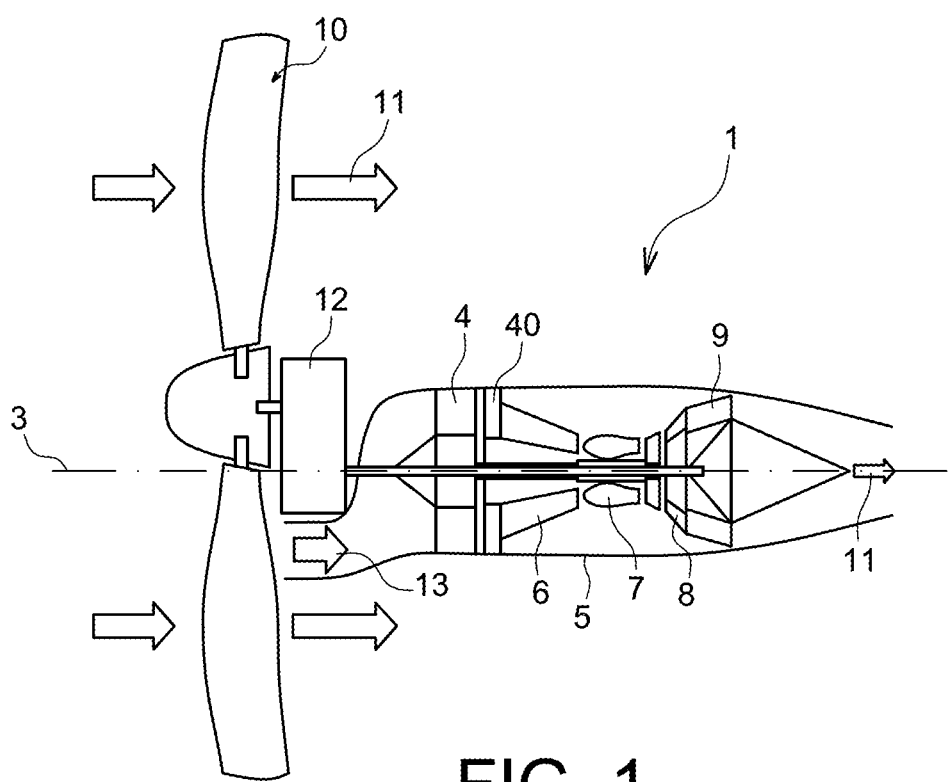
FIG. 1 shows a schematic view in longitudinal section of a turboprop engine, according to a preferred embodiment of the invention.

Identical, similar or equivalent parts in the various figures bear the same numerical references so as to facilitate passing from one figure to another.

FIG. 1 depicts a turboprop engine 1 determining a power turbine axis 3.

The turbomachine 1 comprises, from upstream to downstream considering a routing in the direction of the axis 3, a propeller 10, a gearbox 12, radial casing arms 4, for example four in number, a compressor 6, a combustion chamber 7, a high-pressure turbine 8 and a power turbine 9. The compressor 6, the combustion chamber 7, the high-pressure turbine 8 and the power turbine 9 are surrounded by a casing 5. They define in common, in relation to the casing 5, a primary stream 13 through which a primary flow passes flowing in the direction from upstream to downstream, depicted by the arrow 11. This direction 11 also corresponds to the thrust force of the turbomachine in operation.

The thrust of the gases emerging from the combustion chamber 7 drives the compressor 6 and the turbines 8 and 9 in rotation about the axis 3 of the power turbine. The rotation of the power turbine 9 about its axis 3 is transmitted to the propeller 10 by means of the gearbox 12 so as to rotate the propeller 10. The flow of air stirred by the propeller is considered here to be a secondary flow that determines most of the propulsive energy of the turbomachine.

The blades 40 are compressor inlet stator blades 40, situated at the inlet of the compressor 6. They are fixed and serve to redirect the air flow supplying the primary stream 13 in the axis 3 of the turbomachine 1.

With reference to FIGS. 2 and 3, the blade 40 comprises a vane 50 extending radially in a spanning direction 43. The vane 50 comprises a leading edge 51 and a trailing edge 53. The leading edge 51 is connected to the trailing edge 53 by a pressure face 56 and a suction face 58 spaced apart from each other.

The compressor inlet stator vane 50 has a height h (FIG. 2), that is to say the extent of the blade in the spanning direction, for example between 90 and 100 millimeters. The chord of the blade, measured from the leading edge 51 to the trailing edge 53, is approximately 45 millimeters. Thus the chord corresponds substantially to half the height of the blade.

The thickness of the pressure face 56 or of the suction face 58 close to the leading edge 51 is in particular between 1 and 1.3 millimeters. The maximum thickness of the vane 50 between the trailing edge 51 and the leading edge 53 is approximately 6 millimeters, that is to say approximately one-fifteenth of the height of the blade and approximately one seventh to one eighth of the chord of the blade. The blade 40 thereby has a particularly fine thickness, which involves high constraints in terms of mechanical strength of the vane 40 and of circulation of air inside the vane 50, to heat it.

The blade 40 is a fixed blade comprising an external attachment portion 42 and an internal attachment portion 44 opposite to the external attachment portion 42. The internal 44 and external 42 attachment portions are situated on either side of the vane 50 along the spanning direction 43.

The blade 40 is attached to an external casing (not shown) by means of an external attachment portion 42. The internal attachment portion 44 is mechanically connected to an internal casing (not shown). In a known fashion, the blade 40 can in particular pivot about the external attachment portion 42 with respect to the external casing, and about the internal attachment portion 44 with respect to the internal casing.

The vane 50 comprises an upstream part 52 extending from the leading edge 51 in the direction of the downstream end. In addition, the vane 50 comprises a downstream part 54 extending downstream of the upstream part 52.

The upstream part 52 comprises an internal cavity 55 wherein there emerges an air inlet 42A delimited by the external attachment portion 42. The air inlet portion 42A is delimited by the external attachment portion 42. Air is intended to flow in this cavity 55 via the air inlet 42A. The air is in particular hot air conveyed from the compressor 6 downstream of the blade 40.

The internal cavity 55 extends between the pressure face 56 and the suction face 58 and preferably constitutes the only cavity inside the vane 50. The cavity 55 is extended towards the downstream end of the blade by an internal intersection space 70 comprising a plurality of intersecting transverse partitions 72a, 74a between which air is intended to flow. The intersecting transverse partitions 72a, 74a are each in the form of a plate extending longitudinally from upstream to downstream of the vane 50.

These intersecting transverse partitions 72a, 74a are inclined with respect to the pressure face 56 and the suction face 58, to the benefit of the mechanical reinforcement and the vibratory and acoustic behaviour of these faces. These intersecting transverse partitions 72a, 74a match the downstream part 54 of the vane.

The internal intersecting space 70 extends over an extent 75 along the spanning direction 43 equal at least to the majority of the extent h of the cavity 55 in the spanning direction 43, that is to say the height h of the blade.

Each of the intersecting partitions 72a, 74a extends inside the vane 50 from the internal surface of the pressure face 56 as far as the internal surface of the suction face 58.

In the embodiment depicted, the intersecting transverse partitions 72a, 74a extend as far as the trailing edge 53, that is to say the trailing edge 53 is formed partly by the intersecting transverse partitions 72a, 74a. Because of this, air flows across the trailing edge.

When the intersecting transverse partitions 72a, 74a in addition extend over the entire height of the vane, it is the entire downstream part 54 that delimits the internal intersection space 70.

Each of the intersecting transverse partitions has an extent in the longitudinal direction of the vane 57 that is substantially equal to the length of the intersection space 70 in this direction 57.

These intersecting partitions 72a, 74a comprise lateral partitions 72a spaced apart from each other along the spanning direction 43, so as to form a first set of partitions 72 inclined with respect to the spanning direction 43. The first partitions 72a are parallel to one another.

The intersecting transverse partitions 72a, 74a comprise a second set of partitions 74 formed by transverse partitions 74a inclined with respect to the spanning direction 43 in the other direction with respect to the partitions 72a in the first set of partitions 72. The second partitions 74a intersect with the first partitions 72a between the pressure face 56 and the suction face 58. The second partitions 74a are parallel to one another and spaced apart from one another along the spanning direction 43.

The transverse partitions 72a, 74a intersect so as to form crossbars. In particular, the angle formed by two secant partitions 72a, 74a is substantially at 90°. It is in particular between 120° and 30°. It is preferably between 85° and 95°.

The intersecting transverse partitions 72a, 74a form a regular mesh. This regular mesh comprises a middle row of alveoli 76 with a cross-section in the form of a quadrilateral. Two lateral rows of alveoli 77, 78 with a triangular cross-section are arranged on either side of which of the middle row. The longitudinal axes 73 of the alveoli 76 are substantially perpendicular to the spanning direction 43. The axes 73 are also substantially parallel to the longitudinal direction 57 of the vane 50.

This longitudinal direction of the vane corresponds here substantially to what is normally referred to as the "skeleton line" in the aeronautical field, this skeleton line being between the leading edge and the trailing edge, at equal distances between the pressure face and the suction face.

More generally, the alveoli 76 lie in rows along the spanning direction 43. The longitudinal axes 73 of the alveoli 76 are more moreover oriented along the skeleton line so that the air passing over the partitions 72a, 74a emerges in the primary stream 13 with a direction substantially parallel to that of the air that has passed round the blade 40. The flow in the primary stream 13 is then less disturbed than the air discharged through the intersecting transverse partitions 72a, 74a at the trailing edge 53, and the air, at the trailing edge 53, that has passed round the blade 40 have the same flow direction.

The outside of the vane 50 is in contact with particularly cold air arriving in the primary stream 13, upstream of the compressor. Because of this, the vane 50 is heated by the hot air introduced through the air inlet 42A in the direction of the arrow 60, flowing in the internal cavity 55 of the vane in the direction of the arrows 62 and 64, then between the intersecting transverse partitions 72a, 74a in the longitudinal direction 73 of the alveoli, before being discharged at the trailing edge 53 in the direction of the arrow 66. The method for manufacturing the blade 40 comprises a step of manufacturing the intersecting transverse partitions 72a, 74a by laser fusion of metal powder. In general terms, the blade 40 is manufactured by additive manufacture.

The blade 40 depicted in FIGS. 2 and 3 is a very thin compressor inlet stator blade. In this regard, the greatest thickness 49 of the vane 50 is approximately 4.5 to 6 times greater than the thickness 59 of the pressure face 56 or of the suction face 58. Moreover, the mean thickness 61 of the blade at the trailing edge 53 is approximately equal to twice the mean thickness 59 of the pressure or suction face along the longitudinal direction 57 of the vane.

In this preferred configuration, the intersecting transverse partitions 72a, 74a confer at the same time better heat exchanges inside the vane 50, compatibility with the mechanical strength constraints of the vane 50, and compatibility with a small thickness of the vane 50, in particular at the trailing edge 53.

According to a variant embodiment (not shown), the blade is a turbine impeller blade or a turbine nozzle blade. The constraints of low thickness of the trailing edge 53 are then less great. When the blade is a turbine blade, the intersecting transverse partitions 72a, 74a serve so that the cooling air can flow from the cavity 55 in the internal intersection space 70 in the direction of the trailing edge 53.

When the blade 40 is a turbine impeller blade, the vane 50 is carried by a root and the cavity is supplied with air from the root. The root replaces the internal attachment portion 42 depicted in FIG. 2 and the external attachment portion 44 depicted in this figure is replaced by the apex of the blade.

It can also be envisaged that at least some of the air inside the vane 50 be discharged upstream of the trailing edge 53, for example through cooling outlet slots between portions of the intersecting walls.

Naturally, various modifications can be made by a person skilled in the art to the invention that has just been described without departing from the scope of the disclosure of the invention.

The invention claimed is:

1. A turbomachine blade, comprising:
   a vane comprising a leading edge and a trailing edge, the vane comprising a pressure face and a suction face spaced apart from each other and connecting the leading edge to the trailing edge; and
   at least one internal cavity between the pressure face and the suction face, wherein air is intended to flow,
   wherein the vane comprises intersecting transverse partition walls, each wall comprising a plate disposed in an internal intersection space located downstream of the cavity and arranged between the pressure face and the suction face, wherein each plate is parallel to a longitudinal direction of the vane so that air can flow from the cavity in the direction of the trailing edge between the intersecting partitions.

2. The turbomachine blade according to claim 1, wherein the intersecting transverse partition walls extend as far as the trailing edge formed partly by the intersecting transverse partition walls, so that air can flow across the trailing edge.

3. The turbomachine blade according to claim 1, wherein the intersecting transverse partition walls are spaced apart from one another along the spanning direction of the vane.

4. The turbomachine blade according to claim 1, wherein the intersecting transverse partition walls extend at least over the majority of the extent of the cavity in the spanning direction.

5. The turbomachine blade according to claim 1, wherein at least one of the intersecting transverse partition walls extends from an internal surface of the pressure face as far as an internal surface of the suction face.

6. The turbomachine blade according to claim 5, wherein each of the intersecting transverse partition walls extends from the internal surface of the pressure face as far as the internal surface of the suction face.

7. The turbomachine blade according to claim 1, wherein the blade comprises an attachment portion, external or internal, delimiting an air inlet emerging in the cavity, and wherein the intersecting transverse partition walls determine rows of alveoli, wherein a longitudinal axes of the alveoli are both substantially parallel to the longitudinal direction of the vane and transverse to the air inlet.

8. The turbomachine blade according to claim 1, wherein the intersecting transverse partition walls form a regular mesh.

9. The turbomachine blade according to claim 8, the regular mesh comprising a middle row of alveoli with a cross-section in the form of a quadrilateral, wherein on either side of the quadrilateral there are arranged two lateral rows of alveoli with a triangular cross-section.

10. The turbomachine blade according to claim 1, wherein the intersecting transverse partition walls are inclined with respect to both the pressure face and the suction face.

11. A turbomachine compressor comprising at least one blade according to claim 1, wherein the blade is an inlet stator blade of the compressor.

12. A turbomachine comprising a compressor according to claim 11.

13. A method for manufacturing a blade, the blade comprising:
- a vane comprising a leading edge and a trailing edge, the vane comprising a pressure face and a suction face spaced apart from each other and connecting the leading edge to the trailing edge; and
- at least one internal cavity between the pressure face and the suction face, wherein air is intended to flow, in particular air coming from a turbomachine compressor,
- the vane comprises intersecting transverse partition walls, each wall comprising a plate disposed in an internal intersection space located downstream of the cavity and arranged between the pressure face and the suction face, wherein each plate is parallel to a longitudinal direction of the vane so that air can flow from the cavity in the direction of the trailing edge between the intersecting partitions, the method comprising a step of manufacturing the intersecting transverse partition walls by laser fusion of metal powder.

14. A turbomachine blade, comprising:
- a vane comprising a leading edge and a trailing edge, the vane comprising a pressure face and a suction face spaced apart from each other and connecting the leading edge to the trailing edge; and
- at least one internal cavity between the pressure face and the suction face, wherein air is intended to flow,
- wherein the vane comprises intersecting transverse partitions, in an internal intersection space arranged between the pressure face and the suction face downstream of the cavity, so that air can flow from the cavity in the direction of the trailing edge between the intersecting partitions, and
- wherein the intersecting transverse partitions form a regular mesh, the regular mesh comprising a middle row of alveoli with a cross-section in the form of a quadrilateral, wherein on either side of the quadrilateral there are arranged two lateral rows of alveoli with a triangular cross-section.

* * * * *